US009631549B2

(12) United States Patent
Abani et al.

(10) Patent No.: US 9,631,549 B2
(45) Date of Patent: Apr. 25, 2017

(54) FUEL INJECTION WITH SWIRL SPRAY PATTERNS IN OPPOSED-PISTON ENGINES

(71) Applicant: ACHATES POWER, INC., San Diego, CA (US)

(72) Inventors: Neerav Abani, San Diego, CA (US); Clark A. Klyza, San Diego, CA (US); Fabien G. Redon, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 91 days.

(21) Appl. No.: 14/427,266

(22) PCT Filed: Sep. 18, 2013

(86) PCT No.: PCT/US2013/060429
§ 371 (c)(1),
(2) Date: Mar. 10, 2015

(87) PCT Pub. No.: WO2014/052126
PCT Pub. Date: Apr. 3, 2014

(65) Prior Publication Data
US 2015/0285127 A1    Oct. 8, 2015

Related U.S. Application Data (60) Provisional application No. 61/705,561, filed on Sep. 25, 2012.

(51) Int. Cl.
*F02B 23/06*    (2006.01)
*F02M 61/18*    (2006.01)
(Continued)

(52) U.S. Cl.
CPC ...... *F02B 23/0648* (2013.01); *F02B 23/0624* (2013.01); *F02B 23/0663* (2013.01);
(Continued)

(58) Field of Classification Search
CPC .. F02B 23/0648; F02B 75/28; F02B 23/0624; F02B 23/0669; F02B 23/0663;
(Continued)

(56) References Cited

U.S. PATENT DOCUMENTS 4,971,254 A    11/1990  Daly et al.
5,042,441 A     8/1991  Paul et al.
(Continued)

FOREIGN PATENT DOCUMENTS

JP    2009138718 A1    6/2009

OTHER PUBLICATIONS

International Search Report dated Nov. 18, 2013 for PCT application No. PCT/US2013/060429.
(Continued)

*Primary Examiner* — Joseph Dallo
(74) *Attorney, Agent, or Firm* — Terrance A. Meador (57) ABSTRACT

In a fuel injection spray pattern for an opposed piston engine, the individual spray plumes have both radial and tangential components with respect to an injection axis (102, 114, 121), which adds a swirl component to a spray pattern of fuel directly injected into the combustion chamber of the opposed piston engine.

20 Claims, 11 Drawing Sheets

(51) Int. Cl.
   *F02M 61/16* (2006.01)
   *F02B 25/08* (2006.01)
   *F01B 7/14* (2006.01)
   *F02B 75/28* (2006.01)
(52) U.S. Cl.
   CPC .......... *F02B 23/0669* (2013.01); *F02B 75/28* (2013.01); *F02M 61/162* (2013.01); *F02M 61/1813* (2013.01); *F01B 7/14* (2013.01); *F02B 25/08* (2013.01); *F02B 75/282* (2013.01); *Y02T 10/125* (2013.01)
(58) Field of Classification Search
   CPC ..... F02B 75/282; F02B 25/08; F02M 61/162; F02M 61/1813; F01B 7/14; Y02T 10/125
   See application file for complete search history.

(56) References Cited

U.S. PATENT DOCUMENTS

| | | | |
|---|---|---|---|
| 6,360,960 B1 | 3/2002 | Nally, Jr. et al. | |
| 6,616,072 B2 | 9/2003 | Harata et al. | |
| 6,799,551 B2 | 10/2004 | Nakakita et al. | |
| 7,017,839 B2 | 3/2006 | Heyse | |
| 7,032,566 B2 | 4/2006 | Cavanagh et al. | |
| 7,191,961 B2 | 3/2007 | Okamoto et al. | |
| 7,264,181 B2 | 9/2007 | Abe et al. | |
| 2010/0051727 A1 | 3/2010 | Irino et al. | |
| 2011/0114070 A1* | 5/2011 | Liu | F02B 25/08 123/590 |
| 2011/0239982 A1* | 10/2011 | Straub | F02B 23/0624 123/306 |
| 2011/0271932 A1* | 11/2011 | Fuqua | F01B 7/02 123/301 |
| 2011/0289916 A1* | 12/2011 | Dion | F02F 1/186 60/605.2 |
| 2012/0073541 A1 | 3/2012 | Fuqua et al. | |
| 2012/0080007 A1* | 4/2012 | Herold | F02B 23/0645 123/299 |
| 2012/0192831 A1* | 8/2012 | Tusinean | F02B 23/0663 123/299 |
| 2013/0014718 A1* | 1/2013 | Shen | F02B 23/0675 123/18 A |
| 2013/0104848 A1* | 5/2013 | Klyza | F02M 69/045 123/445 |
| 2013/0112175 A1* | 5/2013 | Wahl | F02F 3/16 123/51 R |
| 2013/0146021 A1* | 6/2013 | Hofbauer | F02B 17/005 123/299 |
| 2013/0213342 A1* | 8/2013 | Burton | F02F 3/26 123/193.6 |
| 2014/0014063 A1* | 1/2014 | Redon | F02B 75/16 123/295 |
| 2014/0083396 A1* | 3/2014 | Burton | F01B 7/02 123/51 R |
| 2014/0165967 A1* | 6/2014 | Bucksey | F01B 7/08 123/46 A |

OTHER PUBLICATIONS

Nishida et al., "Atomization Characteristics of Multi-Hole Swirl Injectors for Direct Injection Engines—Observation of Spray Behavior and Calculation of Injector Internal Flow", Institute for Liquid Atomization and Spray Systems, ICLASS 2003 Proceedings, ICLASS 2003, p. 14-25, Jul. 2003.

Dreeben et al., "Effect of Sac Volume on Injector Performance", SAE Technical Paper Series 20680, International Congress & Exposition, Detroit, Michigan, Feb. 24-28, 1992.

Kao et al., "Form Measurements of Micro-Holes", Measurement Science and Technology, 18 (2007), p. 3603-3611.

\* cited by examiner

FUEL INJECTION WITH SWIRL SPRAY PATTERNS IN OPPOSED-PISTON ENGINES

RELATED APPLICATIONS

This application contains subject matter related to the subject matter of U.S. patent application Ser. No. 13/136,954, filed Aug. 15, 2011, for "Fuel Injection Spray Patterns for Opposed Piston Engines", and published as US 2012/0073541 A1 on Mar. 29, 2012.

This application contains subject matter related to the subject matter of U.S. patent application Ser. No. 13/066,589, filed Apr. 18, 2011, for "Combustion Chamber Constructions for Opposed Piston Engines", and published as US 2011/0271932 A1 on Nov. 10, 2011.

BACKGROUND

The field is fuel injection in opposed-piston engines in which a combustion chamber is defined between end surfaces of pistons disposed in opposition in the bore of a ported cylinder. More particularly, the field includes direct fuel injection through the side of a cylinder into the combustion chamber of an opposed-piston engine.

Fuel injection is an important component of combustion in diesel engines and is one of the processes that affect the efficiency with which the diesel engine operates. It is desirable to manage fuel injection so as to maximize the heat produced by combustion while minimizing transfer of the heat of combustion to engine components such as cylinder bore and piston surfaces. An opposed piston engine typically employs two fuel injectors that inject fuel in opposing directions along a diameter of the cylinder. See, for example, the fuel injection constructions described and illustrated in commonly-owned US publication 2012/0073541 A1.

A diesel injector typically includes a nozzle with a plurality of holes through which fuel is injected. The holes are arranged radially with respect to an axis of the injector. Injection through multiple holes produces a spray pattern constituted of one or more plumes that project radially outward from the injector axis. Typically a plume is represented by a vector that forms an angle (a "spray angle") in a respective plane shared with the injector axis. A wider spray angle results in a plume being injected at a higher angle away from the injector axis. This is desirable because the fuel of each individual plume burns in the presence of air independently of the other plumes. There is less interaction of individual plumes and hence, a faster burn time. However, in an opposed piston engine, a wider spray angle also pushes the plume and hence the flame closer to the cylinder bore and piston surfaces, resulting in combustion near those surfaces. This can result in excessive heat transfer into the cylinder liner and piston walls. Such heat transfer results in a loss of power; and a higher heat transfer loss means lower indicated thermal efficiency of the engine. Heat transfer can be reduced by directing the plumes away from the cylinder bore surface.

To reduce the heat transfer across the pistons and walls, the spray angle of the multiple holes is reduced. However, this leads to interaction of opposing spray plumes that concentrates fuel-vapor, entrained air, and some hot combustion products around the central region of the combustion chamber. This inhibits air/fuel mixing, which results in increasing burn time.

To achieve both faster burn and reduced heat transfer to the cylinder bore and piston surfaces in opposed piston operation, it is desirable that fuel injection spray patterns minimize interaction of sprays (both from the same injector and opposite injectors), minimize the transfer of heat to the piston and cylinder bore surfaces, and encourage faster fuel/air mixing.

SUMMARY

A fuel injection spray pattern in which the individual spray plumes have both radial and tangential components with respect to an injection axis adds a swirl component to a spray pattern of fuel directly injected into the combustion chamber of an opposed piston engine. As compared to a spray pattern that has only a radial component, a spray pattern with a swirl component minimizes the interaction of injected fuel sprays so as to provide a faster burn time. At the same time, the addition of a tangential component provides additional distance for a spray plume to travel without encountering piston surfaces, the cylinder bore, and/or opposing spray plumes, which reduces heat transfer across the piston and cylinder walls while promoting faster air/fuel mixing.

In some aspects, the swirl spray pattern is directly injected into the combustion chamber through a cylinder sidewall. In some aspects, the swirl spray pattern has an injection axis that is aligned with a longitudinal axis of the combustion chamber; in some of these aspects, the injection axis is transverse to the longitudinal axis of the cylinder.

It other aspects, direct side injection includes injection of swirl spray patterns in opposing radial directions of a cylinder bore into a combustion chamber of an opposed-piston engine wherein charge air has a complex, turbulent motion. Preferably, the air motion includes swirl and tumble components.

A fuel injector having a nozzle with a multi-hole construction that produces a swirl spray pattern is hereinafter referred to as a multiple-hole swirl injector (MHSI). While conventional multiple-hole injector nozzle constructions are designed such that a plane can pass through a vector representing an individual plume and the injector axis, a MHSI produces a swirl spray pattern characterized by one or more spray plumes whose vectors do not lie in a plane that contains the injector axis.

DETAILED DESCRIPTION OF THE PREFERRED EMBODIMENTS

In the following description, "fuel" is any fuel that can be used in an opposed-piston engine. The fuel may be a relatively homogeneous composition, or a blend. For example, the fuel may be diesel fuel or any other fuel ignitable by compression ignition. Further, the descriptions contemplate ignition resulting from compression of an air/fuel mixture; however it may be desirable to provide additional mechanisms, such as glow plugs, to assist compression ignition. The descriptions contemplate injection of fuel into a compressed gas in a combustion chamber when opposed pistons are at or near TDC locations. The gas is preferably pressurized ambient air; however, it may include other components such as exhaust gases or other diluents. In any such case, the gas is referred to as "charge air.

Figure 1A:
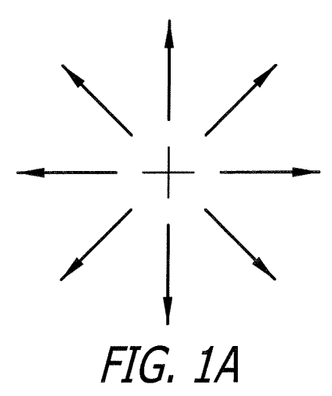
FIGS. 1A and 1B are schematic diagrams that illustrate the effect of adding a swirl component to a fuel spray pattern with respect to the injector axis of an 8-hole injector.
Figure 1B:
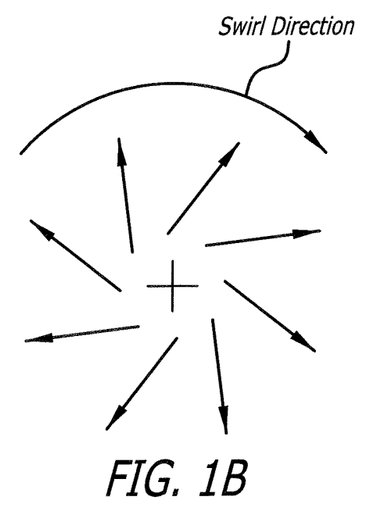

FIGS. 1A and 1B schematically illustrate the effect of a swirl component in the individual plumes of an injected spray pattern with respect to the injector axis for an 8-hole injector. FIG. 1A represents the end-on view of an 8-hole nozzle of a conventional fuel injector, and FIG. 1B represents the end-on view of an 8-hole nozzle of an MHSI. In each figure, the dark arrows are spray plume vectors and the central cross is the injector axis. As per FIG. 1A, in a conventional 8-hole fuel injector nozzle, the spray plume vectors are oriented radially away from the injector axis and have no tangential component. The result is a spray pattern having the shape of an axisymmetric cone. As per FIG. 1B, in addition to a radial component, each plume vector of an 8-hole MHSI has a tangential component; that is to say, each plume vector has both a radial and a skew component with respect to an injection axis which is collinear with the injector axis. As a consequence of the skew component, an axisymmetric spray pattern with circumferential velocity is produced, and the effect is to cause the spray pattern to swirl with respect to the injection axis. Hereinafter, a spray pattern with a swirl component is referred to as a "swirl spray pattern". As shown in FIG. 1B, the swirl has a clockwise (CW) direction, although this is for illustration only and is not meant to exclude other swirl directions including counter-clockwise (CCW).

Beneficially, the swirl spray pattern of FIG. 1B increases mixing of fuel-vapor with surrounding air and also reduces impingement of fuel spray plumes onto the piston and bore surfaces. The reduction in the impingement of spray plumes comes because each spray plume tip requires more penetration to reach the same normal distance from the injector as the cone-shaped spray pattern of FIG. 1A. Also the swirling effect of the spray patterns provides more coherent structure of sprays to penetrate the air and hence provides faster burn time. This also reduces emissions such as soot and CO, thereby increasing combustion efficiency.

Figure 2A:
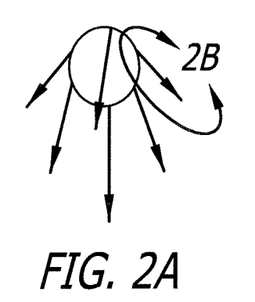
FIG. 2A is a schematic diagram that illustrates a plurality of 3-hole groups of an 18-hole injector having a multiple-hole swirl injection pattern.
Figure 2B:
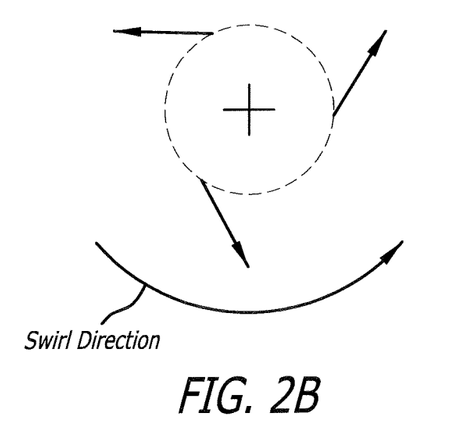
FIG. 2B is an enlarged schematic view showing a swirl spray pattern of a three-hole group.

FIG. 2A schematically represents an end-on view of an 18-hole injector MHSI, in which each arrow represents an injection axis of a group of three injector holes. As seen in FIG. 2B, the plume vectors of each of the three-hole groups have both radial and skew components. As a consequence of the skew components, angular momentum is imparted to the spray pattern of each three-hole group and the effect is to cause the spray pattern to swirl with respect to an injection axis of the group. As shown in FIG. 2B, the swirl pattern of each three-hole group has a counter-clockwise (CCW) direction, although this is for illustration only and is not meant to exclude other swirl directions including clockwise (CW).

Figure 3A:
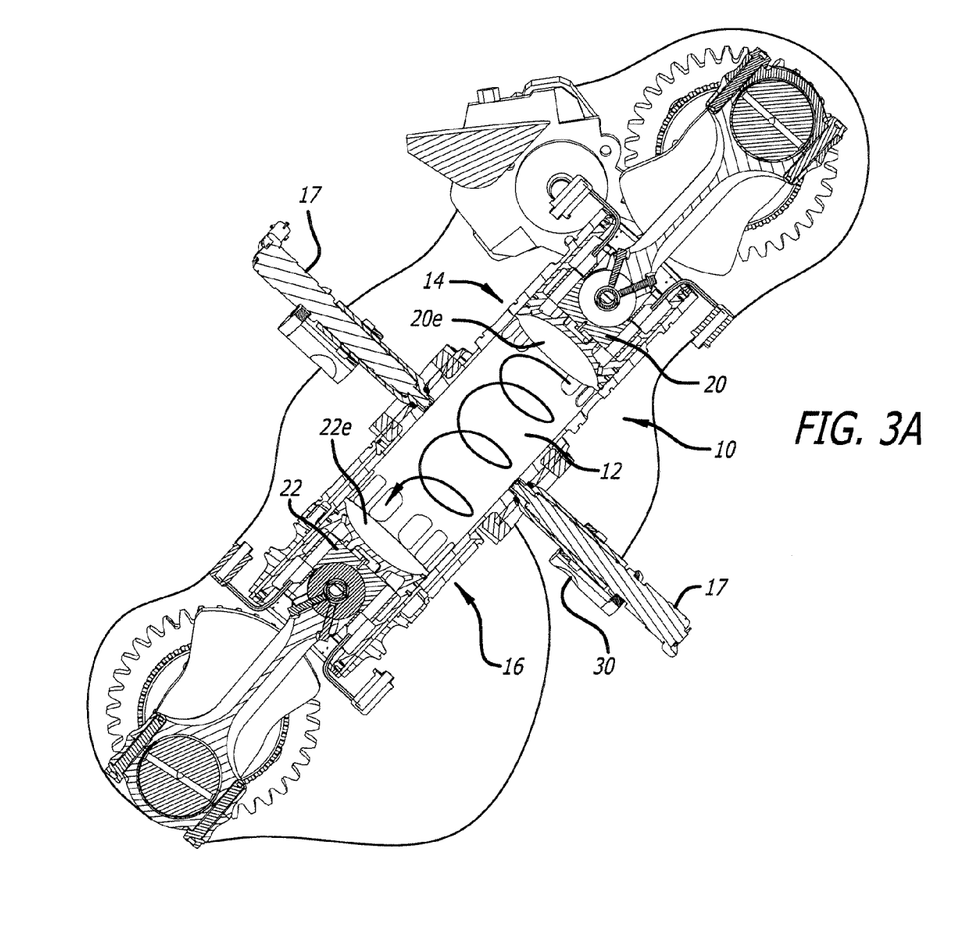
FIGS. 3A and 3B illustrate a cylinder of an opposed piston engine in which fuel injectors are positioned for direct side injection of fuel into a combustion chamber formed when the opposed pistons in the cylinder are near top dead center positions.
Figure 3B:
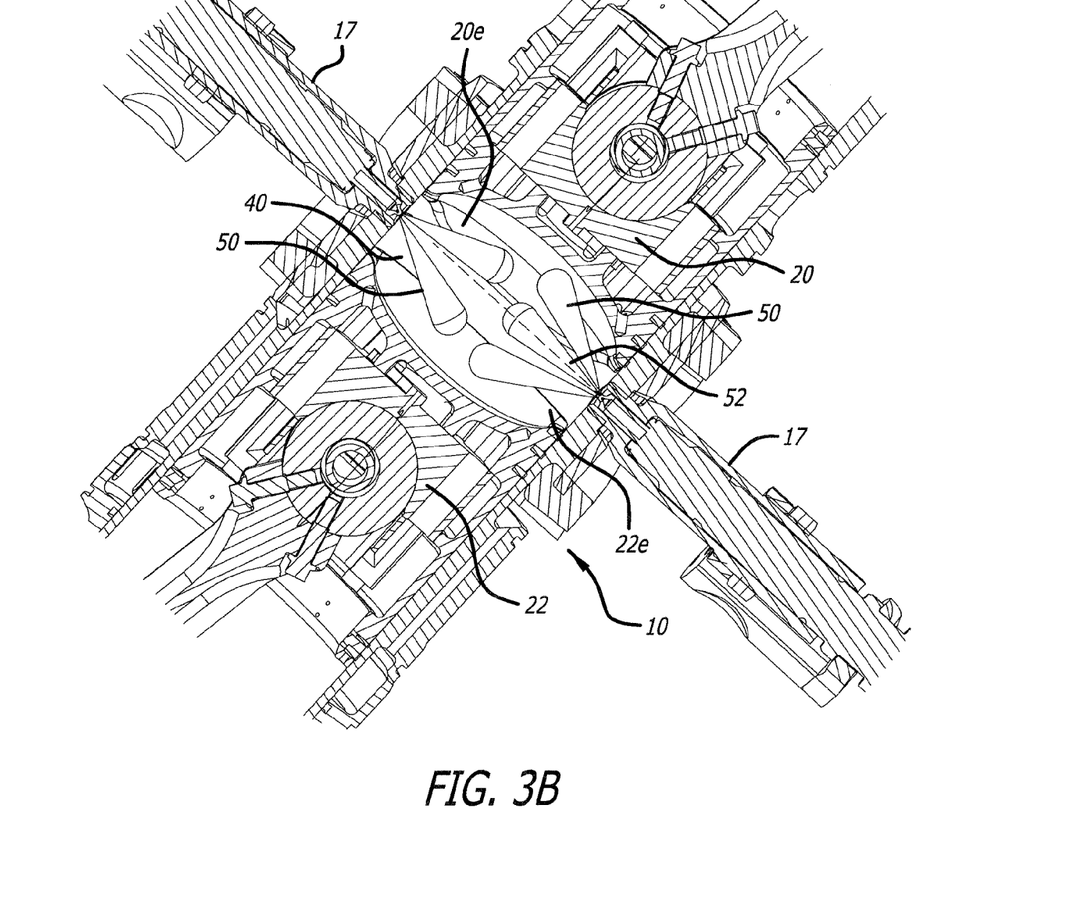

A combustion chamber construction in an opposed piston engine is explained with reference to FIGS. 3A and 3B. FIG. 3A shows the cylinder in cross section, with the opposed pistons near bottom dead center (BDC) positions at the end of a power stroke, the exhaust port fully open, and blowdown initiated; FIG. 3B shows the cylinder in cross section, with the opposed pistons near top dead center (TDC) positions near the end of a compression stroke, the combustion chamber formed, and direct side injection into the combustion chamber initiated.

As per FIG. 3A, the opposed piston engine includes at least one cylinder 10 with a bore 12 and longitudinally-separated intake and exhaust ports 14 and 16. One or more fuel injectors 17 are secured in injector ports (ports where injectors are positioned) that open through the side surface of the cylinder. Preferably, but not necessarily, two fuel injectors 17 are mounted for direct side injection into the cylinder; in some aspects, the fuel injectors are oriented in opposition along a generally diametrical direction of the cylinder. According to one aspect, each fuel injector 17 is an MHSI constructed to inject a swirl spray pattern into the cylinder 10. Two pistons 20, 22 are disposed in the bore 12 with their end surfaces 20e, 22e in opposition to each other. For convenience, the piston 20 is denominated as the "intake" piston because of its proximity to the intake port 14. Similarly, the piston 22 is denominated as the "exhaust" piston because of its proximity to the exhaust port 16.

In some aspects, a phase offset is introduced into the piston movements. For example, the exhaust piston 22 leads the intake piston 20 and the phase offset causes the pistons to move around their BDC positions in a sequence in which the exhaust port 16 opens as the exhaust piston 22 moves through BDC while the intake port 14 is still closed so that combustion gasses start to flow out of the exhaust port 16. As the pistons continue moving away from each other, the intake piston 20 moves through BDC causing the intake port 14 to open while the exhaust port 16 is still open. A charge of pressurized air enters the cylinder 10 through the open intake port 14, driving exhaust gasses out of the cylinder through the exhaust port 16. After further movement of the pistons, the exhaust port 16 closes before the intake port 14 while the intake piston 20 continues to move away from BDC. Typically, the charge of air is swirled as it passes through ramped openings of the intake port 14. With reference to FIG. 3A, the swirling motion (or simply, "swirl") 30 of the charge air is a generally helical movement of charge air that circulates around the cylinder's longitudinal axis and moves longitudinally through the bore of the cylinder 10.

As seen in FIG. 3B, as the pistons move to TDC positions, a combustion chamber structure 40 is defined between contoured features of the opposing end surfaces 20e, 22e of the pistons. The combustion chamber includes a cavity defined between opposing bowls formed in the end surfaces. Construction and operation of an opposed piston combustion chamber similar to the chamber seen in FIG. 3B can be understood with reference to the two related US patent applications. In some aspects, each fuel injector 17 injects a spray pattern 50 of fuel into the combustion chamber cavity along an injection axis that is oriented at least generally in a diametrical direction 52 of the cylinder; preferably, the spray patterns 50 are injected in opposing radial directions of the cylinder. In some aspects, the spray patterns 50 are injected in opposing directions along a major axis of the combustion chamber. According to some aspects, each spray pattern is a swirl spray pattern. The swirl spray patterns can be longitudinally and rotationally oriented so that the plumes are oriented in opposition in the combustion chamber. In another example, the opposing spray patterns can be mutually rotationally offset so that the plumes are interdigitated. See FIGS. 10B and 10C of related US 2012/0073541 in this regard.

In some further aspects, the combustion chamber 40 is constructed so as to generate turbulent bulk air motion, including swirl, squish, and tumble components, of the charge air compressed between the end surfaces as the pistons approach TDC. Interaction of swirl fuel spray patterns with such complex, turbulent bulk air motion produces good air/fuel mixing in the combustion chamber of an opposed-piston engine. For example, consider the opposed-piston combustion chamber 300 illustrated in FIG. 15B of related US 20110271932, in which a tumbling motion 343 is generated when squish flows encounter the outwardly-directed end surface portions 292 of two opposed pistons 280. In this example, the tumbling motion is a circulating motion of charge air in the combustion chamber that is at least generally transverse to the longitudinal axis of the cylinder 220 in which the pistons are disposed; in the case of the tumbling motion 343, the circulation is generally around the major axis 302 of the combustion chamber. Presume at least one multi-hole swirl injector according to this specification injects a swirl spray pattern having an injection axis that is collinear with the major axis 302. The swirl spray pattern can rotate with or against the tumble circulation, as needed to accomplish a particular fuel/air mixing objective.

Figure 4:
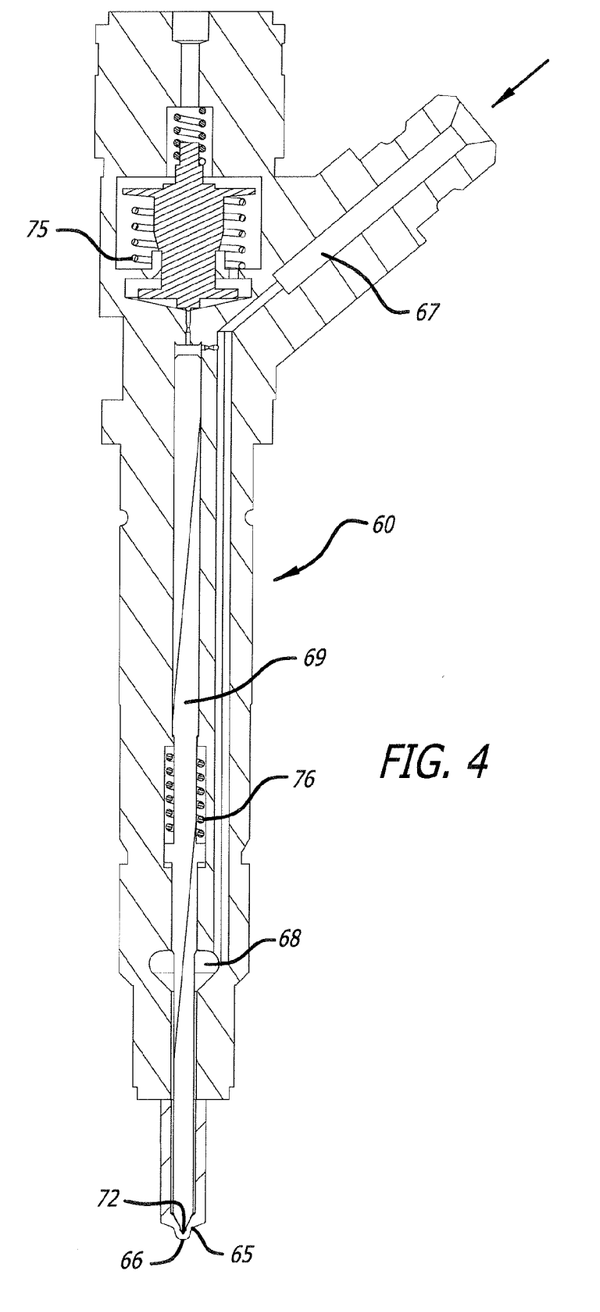
FIG. 4 is a sectional view of one of the fuel injectors seen in FIG. 3.

With reference to FIG. 4, a multi-hole swirl injector 60 has a nozzle 65 constructed for direct injection of fuel having a swirl spray pattern; preferably, the injector 60 is an accumulator-type device. The injector includes an inlet 67 and fuel flows from the inlet, through the fuel injector, to the nozzle. While the nozzle is closed, pressurized fuel is accumulated in a chamber 68 in the interior of the fuel injector. An elongate needle 69 disposed in the body of the fuel injector includes a tip 70 (best seen in FIG. 6) that engages a seat 72 that is in axial alignment with the nozzle. An actuator 75 is operated to retain the needle in a normally seated position in the seat to close holes in the nozzle. When the actuator is operated to release the retaining force, the pressure of fuel accumulated in the chamber lifts the needle from the seat, which causes fuel to flow along the needle and out through holes (not seen in this figure) in the nozzle. As the accumulated pressure in the chamber falls, a spring 76 returns the tip to its normally seated position in the seat, where it is retained by the actuator.

Figure 5:
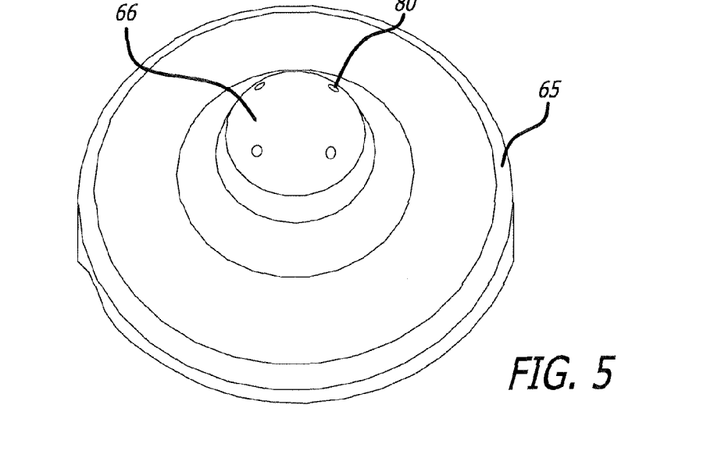
FIG. 5 is an enlarged perspective view of a portion of the nozzle portion of the multi-hole fuel injector of FIG. 4.
Figure 6:
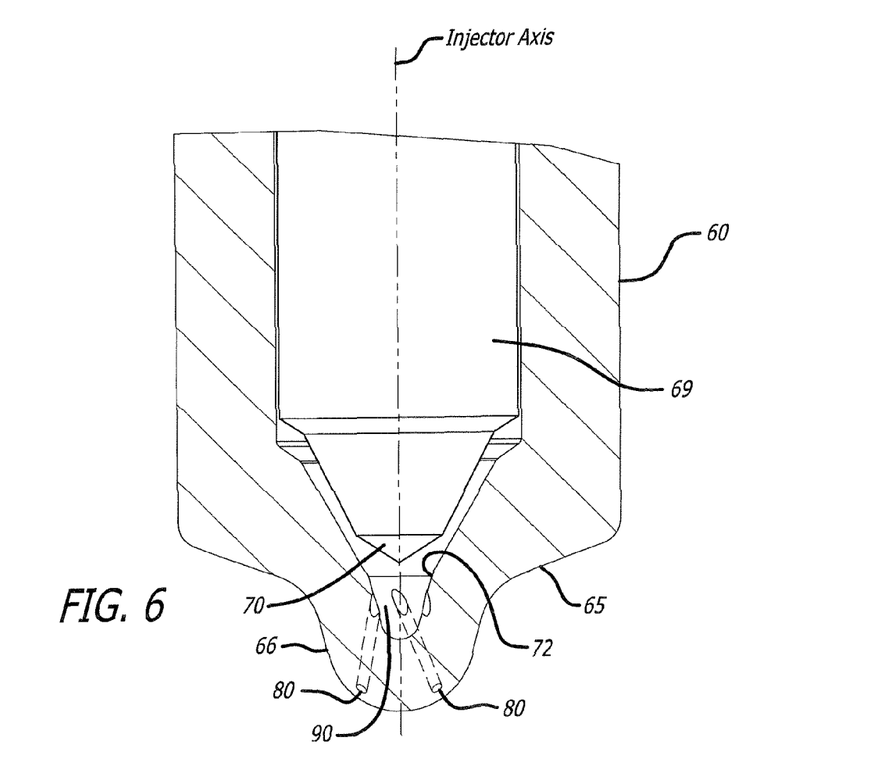
FIG. 6 is an enlarged side sectional view of the nozzle portion of the multi-hole fuel injector of FIG. 4.
Figure 7:
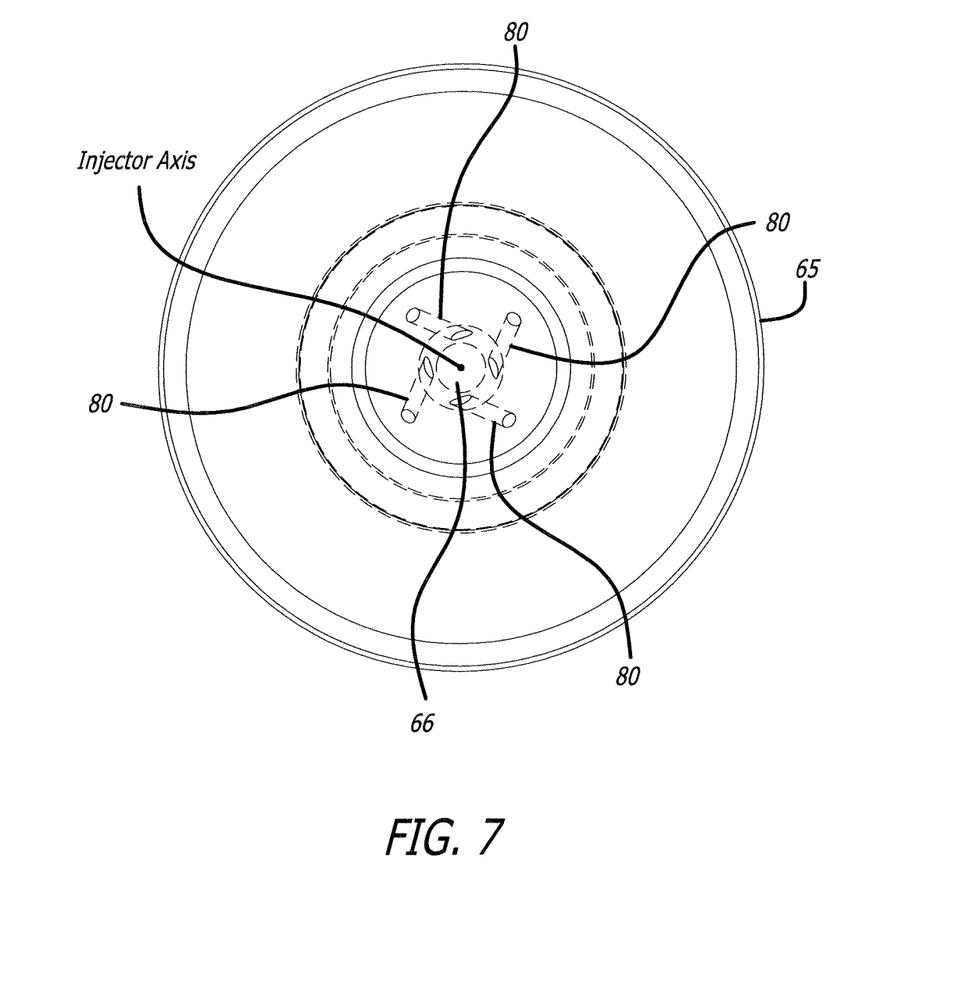
FIG. 7 is an enlarged planar sectional view of the nozzle portion of the multi-hole fuel injector of FIG. 4.
Figure 8:
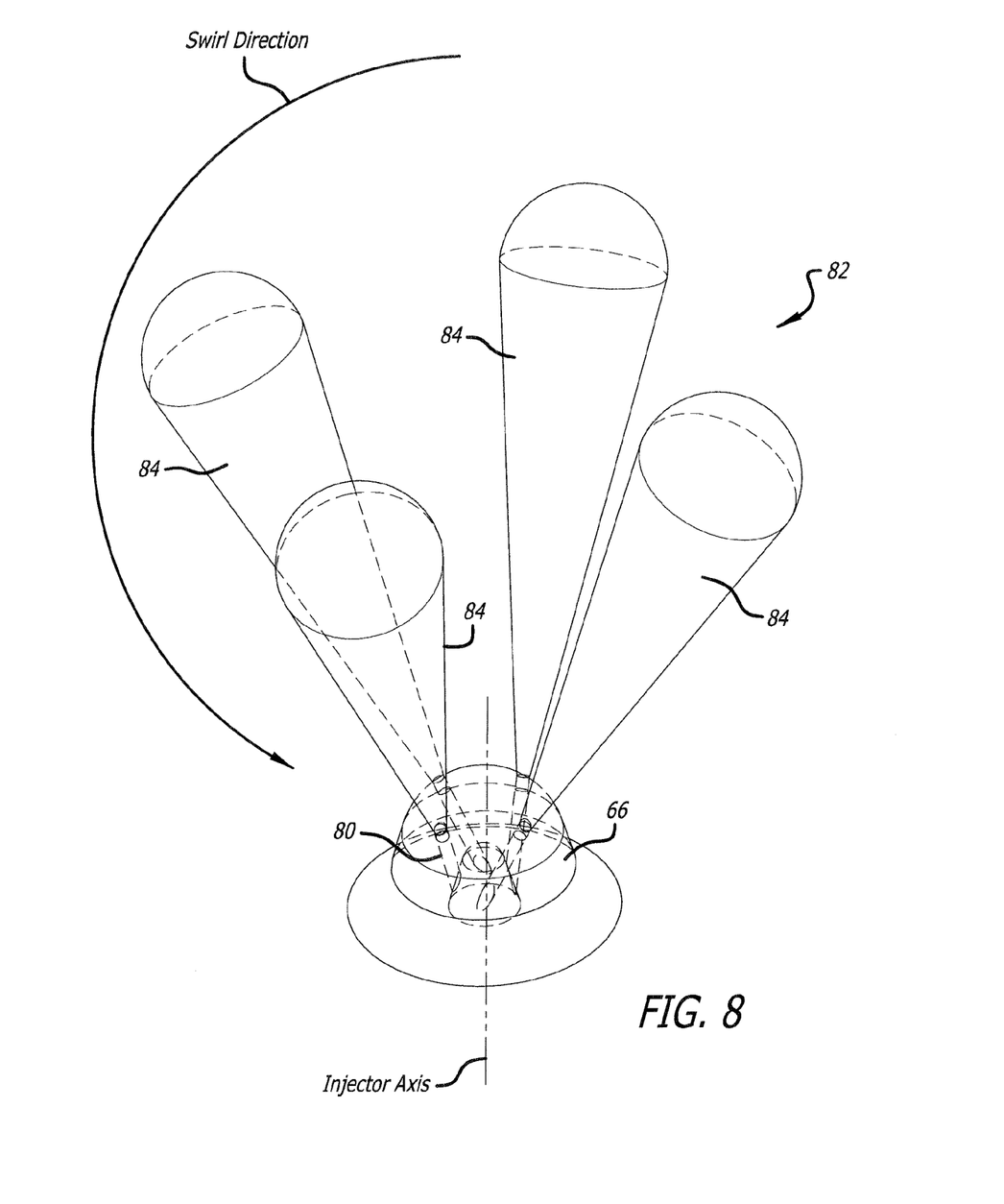
FIG. 8 is an enlarged perspective view of the nozzle portion of the multi-hole fuel injector of FIG. 4 showing a spray pattern produced by multiple-hole swirl injection construction of the nozzle portion of FIGS. 5, 6, and 7.

As per FIGS. 5 and 6, the nozzle 65 is provided with holes in the form of fuel passages 80 through which fuel flows when the needle tip 70 is lifted from the seat 72. The passages 80 are disposed in a generally circumferential array around the tip 66 of the nozzle. Although one such array is shown in FIG. 5, there may be additional and other arrays of passages at greater and/or smaller radial distances from the tip 66 of the nozzle. Each passage is drilled or machined in the nozzle 65 so as to extend from a sac volume 90 under the seat 72 to the outer surface of the nozzle 65 and thus permit pressurized fuel to flow from the fuel injector body and be injected into the cylinder. As per FIGS. 6 and 7, each passage 80 is formed at a non-zero radial angle and a non-zero circumferential angle with respect to the injector axis. Thus, the passages 80 are skewed with respect to the axis of the injector. As a result, an angular momentum is imposed on a plume of fuel ejected through the passage. As best seen in FIG. 8, with all of the passages 80 skewed in the same direction, the resulting spray pattern 82 has a swirl produced by the plumes 84. MHSI construction can be applied to a 2-hole, 3-hole, 4-hole, 5-hole, 6-hole, 7-hole, 8-hole and up to as many radial nozzle holes as can be drilled in an injector.

The injector and nozzle may be fabricated from conventional materials such as, for example, heat treated alloy steel. Hole counts, pitches, and form characteristics of the passages such as shape, size, proportion, straightness, and taper, are selected according to the requirements of an opposed piston engine design.

Swirl Nozzle Constructions and Limitations

Figure 9:
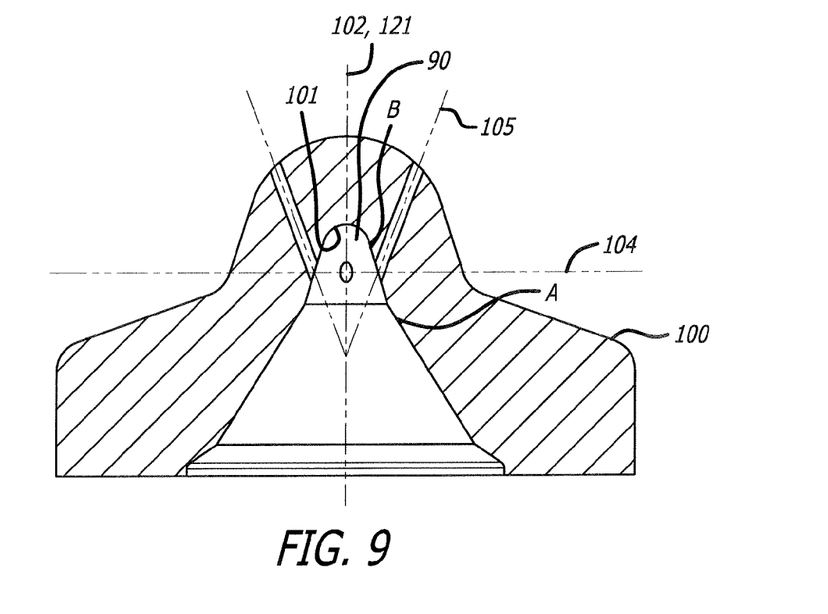
FIG. 9 is a schematic sectional view taken along a central plane containing the vertical centerline of a nozzle for a multi-hole fuel injector showing a radial hole pattern with a single angle.

Presume that the nozzles of multi-hole swirl injectors for an opposed-piston engine have a sac-type construction. FIG. 9 illustrates a schematic side section of a sac type injector nozzle 100, in which hole location is defined by an axis that extends from a point along the vertical centerline of the nozzle body through a point on the sac surface 101 at or near a horizontal plane through the vertical midpoint of the sac volume 90. The location of the point along the vertical centerline 102 of the nozzle body 100 is determined by the desired angle of the hole from the vertical centerline. In this regard, point A in FIG. 9 is on the vertical centerline 102 of the nozzle body 100 and point B is a point on the sac surface 101 at or near a horizontal plane 104 through the vertical midpoint of the sac volume 90. An axis 105 through the two points and extending through the wall of the tip defines the centerline of the hole.

Figure 10:
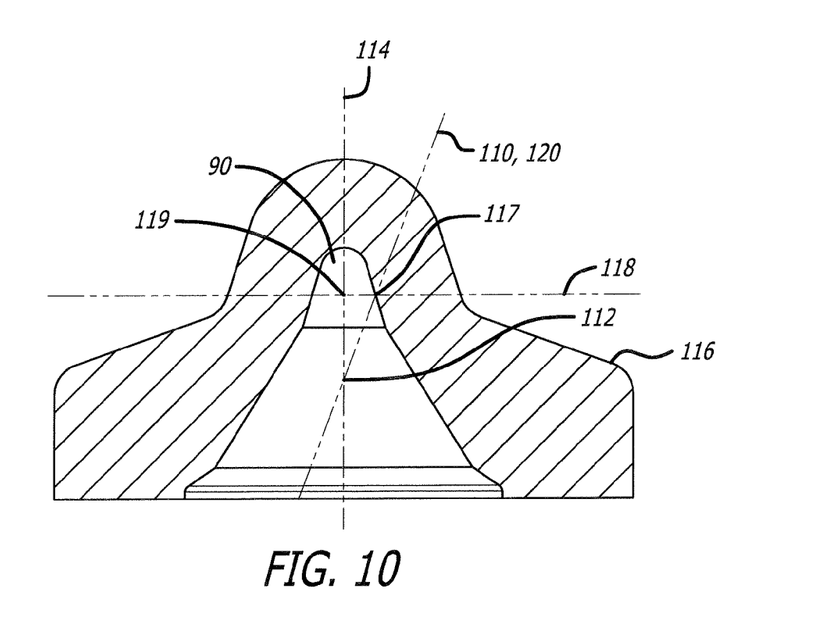
FIG. 10 is a schematic sectional view of a nozzle construction for a multiple-hole swirl injector taken on a central plane defining a primary hole angle.
Figure 11:
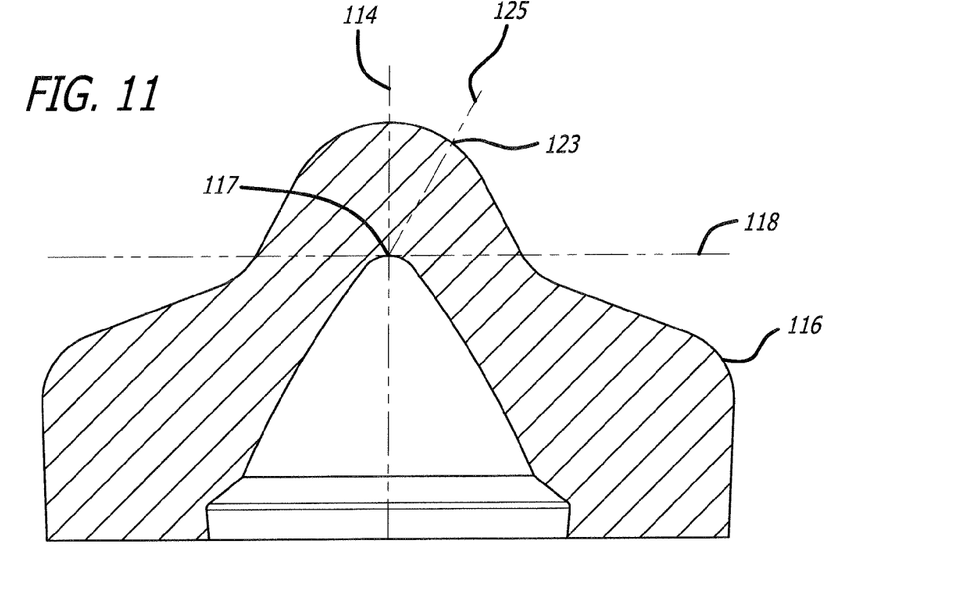
FIG. 11 is a schematic sectional view of the nozzle construction of FIG. 10 taken on a primary angle plane defining a secondary hole angle.

Compound angles are used to create holes that have an inherent swirl component. In this regard, a compound angle of an injector hole of a multi-hole swirl nozzle has two components: a primary angle (providing a radial component) and a secondary angle (providing a tangential component). With reference to FIG. 10, the primary angle is defined by an axis 110 that extends from a point 112 along the vertical centerline 114 of the nozzle body 116 through a point 117 on the sac surface 101 at or near a horizontal plane 118 through the vertical midpoint 119 of the sac volume 90. As per FIGS. 10 and 11, a secondary angle is oriented on a plane 120 that goes through the two points 112, 117 defining the primary angle and is at the same angle as the primary angle from a center plane 121 shown in the cross section thru the central nozzle plane in FIG. 9. The secondary angle is defined by an axis 123 that extends from the end point 117 of the primary angle through a second point 125 located on the primary angle plane and at a horizontal distance from the center plane of the nozzle as defined by the desired angle.

Figure 12:
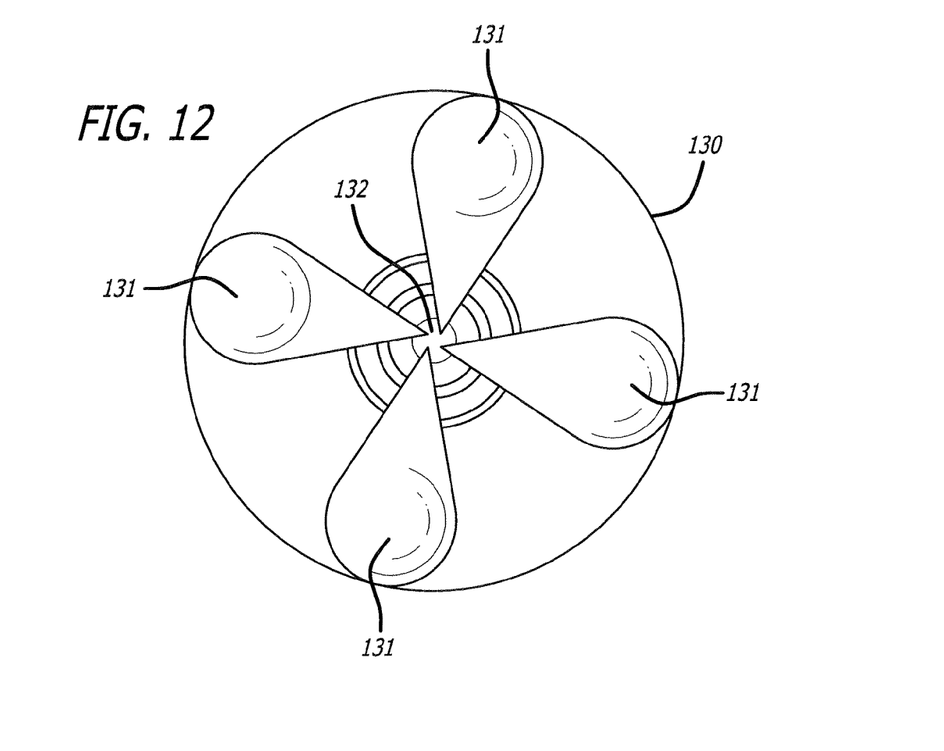
FIG. 12 is a representational drawing showing the spray area of a swirl spray pattern produced by a multiple-hole swirl injector.

The secondary angle dictates the degree of swirl induced in the plumes with a larger angle providing more swirl and at its lower limit of 0 degrees providing no swirl component as in the case of a single-angled hole. As per FIG. 12, the primary angle allows for adjustment of the spray area; defined by the circular area 130 in which the spray plumes 131 are contained at a set distance from the nozzle tip 132. For a given primary angle the spray area is increased as the secondary angle is increased. In order to vary the spray area for a given secondary angle, the primary angle has to be adjusted. A smaller primary angle will provide a smaller spray area for a given secondary angle and conversely a larger primary angle provides a larger spray area for a given secondary angle. The compound angle defining a swirl nozzle hole thus provides a means to control the spray area for a given component of swirl.

Figure 13:
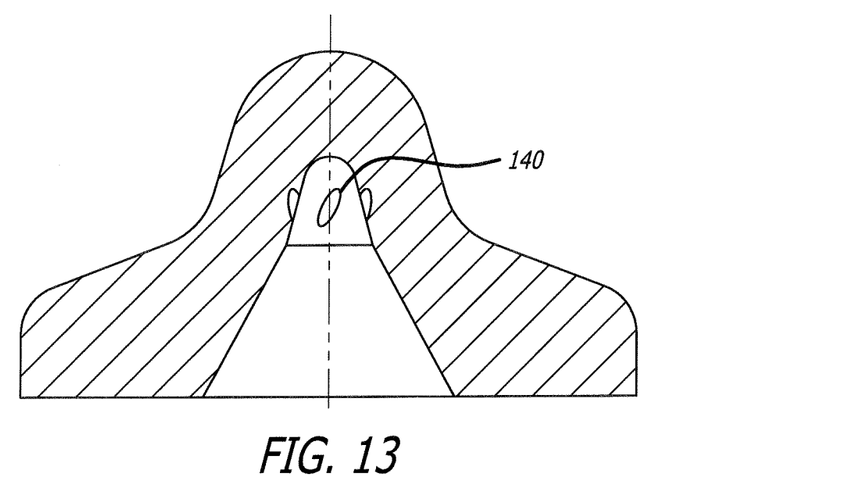
FIGS. 13, 14, 15, 16, and 17 are schematic sectional views of a nozzle construction for a multiple-hole swirl injector taken on a central plane that illustrate construction effects resulting from various combinations of primary and secondary angles.
Figure 14:
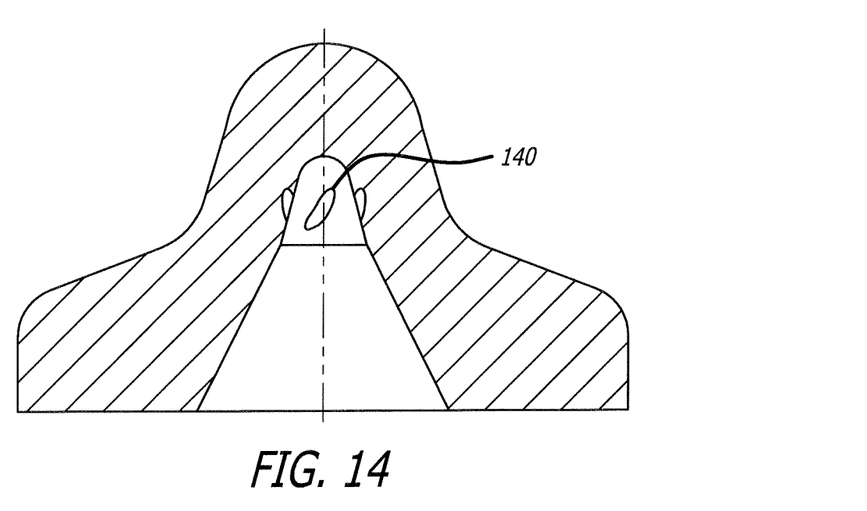
Figure 15:
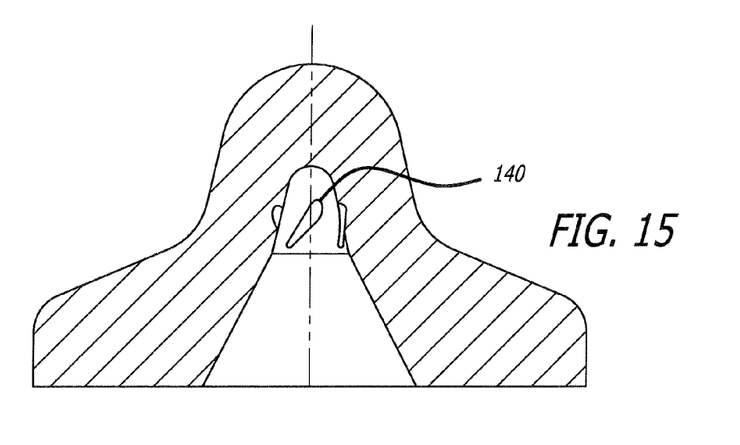
Figure 16:
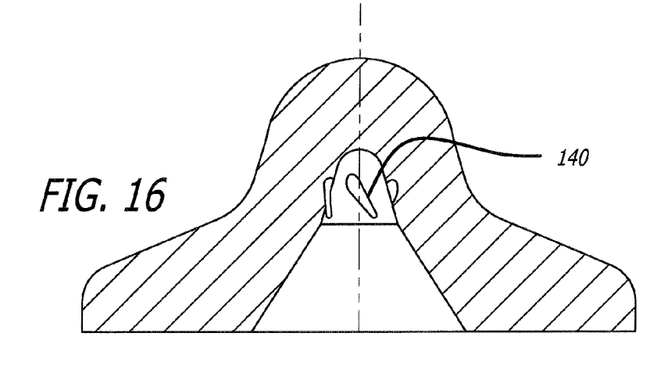
Figure 17:
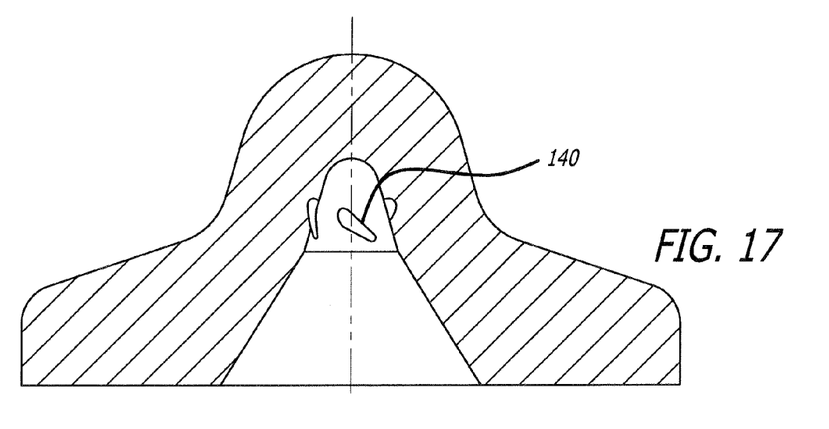

The ability to control the spray area and or the swirl component on a swirl nozzle is limited. As the secondary angle is increased for a given primary angle the intersection at the sac surface elongates and a limit is reached where a smooth entrance to the hole is not possible. In FIG. 13 the hole entrance 140 using a primary angle of 10 degrees and secondary angle of 20 degrees is shown. FIG. 14 illustrates how the hole entrance 140 tilts and elongates as the secondary angle is increased to 30 degrees while maintaining a primary angle of 10 degrees. A limit of 34 degrees is reached for the secondary angle with a 10 degree primary angle as shown in FIG. 15. The limiting value for the secondary angle occurs as a result of the hole interfering with the sac surface before a smooth entrance can be achieved. The maximum value for the secondary angle (that permits a satisfactory hole entrance) varies with the magnitude of the primary angle. Examples of maximum values for the secondary angle with various primary angles are shown in FIGS. 15-17. As shown in FIG. 15 the limiting value for the secondary angle is reached at 28 degrees for a primary angle of 5 degrees. As previously mentioned the limiting value of the secondary angle for a primary angle of 10 degrees is 34 degrees as shown in FIG. 16. A maximum secondary angle of 42 degrees with a primary angle of 20 degrees is shown in FIG. 17. Decreasing values of the primary angle lower the maximum value of the secondary angle. Increasing the value of the primary angle raises the maximum allowable value of the secondary angle.

The degree to which swirl and spray area are limited is also a function of the particular sac geometry. The magnitude of the secondary angle possible for a set primary angle with a conical sac (as shown in the various figures) will differ from a cylindrical sac geometry. The sac diameter and orifice diameter also influence the maximum allowable secondary angle possible for a given primary angle.

Although fuel injection with swirl spray patterns in opposed-piston engines has been described with reference to preferred embodiments, it should be understood that various modifications can be made without departing from the principles thereof. Accordingly, the scope of patent protection should be limited only by the following claims.

The invention claimed is:

1. An opposed-piston engine, comprising:
    at least one cylinder (10) with longitudinally-separated intake and exhaust ports (14 and 16);
    a pair of pistons (20 and 22) disposed in opposition in a bore (12) of the cylinder; and,
    a plurality of multi-hole fuel injectors (17, 60) positioned for direct side injection of fuel into the cylinder, between end surfaces (20e, 22e) of the pistons;
    each of the multi-hole fuel injectors including a nozzle (65) having a sac volume (90) with a sac surface (101) and a plurality of injection holes (80) opening through the sac surface, each injection hole being disposed at a compound angle including a radial angle and a tangential angle with respect to an injection axis, in which:
    the radial angle is defined by an axis (110) that extends from a point (112) along a vertical centerline (114) of the nozzle through a point (117) on the sac surface at or near a horizontal plane (118) through a vertical midpoint (119) of the sac volume (90); and,
    the tangential angle is oriented on a plane (120) containing the two points (112, 117) and is at the same angle as the radial angle from a center plane (121) of the nozzle, and is defined by an axis (123) that extends from the point (117) through a second point (125) located on the plane (120) and at a horizontal distance from the center plane (121).

2. The opposed-piston engine of claim 1, wherein each injection axis is the axis (102, 114) of a respective fuel injector.

3. The opposed-piston engine of claim 1, wherein the plurality of injection holes is disposed in at least one generally circumferential array on the nozzle.

4. A method for operating the opposed-piston engine of claim 1, in which:
    charge air enters the bore (12) through the intake port (14) as the pistons move from respective bottom dead center positions in the bore,
    a combustion chamber (40) is defined between the end surfaces (20e, 22e) as the pistons approach top dead center positions in the bore, and
    swirl spray patterns of fuel are injected into the combustion chamber by the plurality of multi-hole fuel injectors (17, 60).

5. The method of claim 4, wherein the swirl spray patterns of fuel are injected into the combustion chamber in opposing directions of the cylinder.

6. The method of claim 4, wherein a tumble component including a circulating movement of charge air that is at least generally transverse to a longitudinal axis of the cylinder is added to the motion of the charge air.

7. The method of claim 6, in which each spray pattern includes a plurality of plumes disposed in an array with respect to an axis of injection.

8. The method of claim 7, in which the axis of injection is a fuel injector axis.

9. The method of claim 4, in which the charge air swirls in the bore.

10. The method of claim 9, in which a tumble component including a circulating movement of charge air that is at least generally transverse to a longitudinal axis of the cylinder is added to a swirling motion of the charge air as the pistons approach top dead center positions in the bore.

11. The method of claim 10, in which each spray pattern includes a plurality of plumes disposed in an array with respect to an axis of injection.

12. The method of claim 10, in which at least one spray pattern has a motion that rotates with or against the circulating movement.

13. A method for operating the opposed-piston engine of claim 1, by:
    admitting charge air into the bore (12) through the intake port (14) as the pistons (20, 22) move from respective bottom dead center positions in the bore,
    causing a tumbling motion in the charge air between the opposing end surfaces (20e, 22e) of the pistons as the pistons move toward respective top dead center positions in the bore, and side-injecting opposing swirl spray patterns (82) of fuel into the charge air between the opposing end faces by the plurality of multi-hole fuel injectors (17, 60).

14. The method of claim 13, including defining a combustion chamber (40) between the opposing end surfaces of the pistons as the pistons near top dead center positions.

15. The method of claim 14, in which injecting a charge of fuel into the charge of air includes injecting the fuel along a major axis of the combustion chamber.

16. The method of claim 14, in which each spray pattern includes a plurality of plumes disposed in an array with respect to an axis of injection.

17. The method of claim 13, in which a swirling motion is imposed on the air admitted into the bore.

18. The method of claim 17, including defining a combustion chamber between the opposing end surfaces of the pistons as the pistons near top dead center positions.

19. The method of claim 18, in which injecting a charge of fuel into the charge of air includes injecting the fuel along a major axis of the combustion chamber.

20. The method of claim 19, in which each spray pattern includes a plurality of plumes disposed in an array with respect to an axis of injection.

\* \* \* \* \*

UNITED STATES PATENT AND TRADEMARK OFFICE
CERTIFICATE OF CORRECTION

PATENT NO.      : 9,631,549 B2
APPLICATION NO. : 14/427266
DATED           : April 25, 2017
INVENTOR(S)     : Abani et al.

It is certified that error appears in the above-identified patent and that said Letters Patent is hereby corrected as shown below:

In the Drawings

-- Replace Figure 3A with new Figure 3A attached hereto, so that reference numeral 30 is now directed to the swirling motion of the charge air.

In the Specification

-- Column 1, Lines 9 and 10, delete "and published as US 2012/0073541 A1 on Mar. 29, 2012", and replace with "and issued as US Patent 8,820,294 on Sep. 02, 2014.".

-- Column 1, Lines 14 and 15, delete "and published as US 2011/0271932 A1 on Nov. 10, 2011" and replace with "and issued as US Patent 8,800,528 on Aug. 12, 2014.".

-- Column 1, Line 35, delete "commonly-owned US publication 2012/0073541 A1" and replace with "commonly owned US patent 8,820,294.".

-- Column 5, Line 10, delete "patent" and replace with "patents.".

-- Column 5, Line 11, delete "applications.".

-- Column 5, Line 24, delete "US 2012/0073541" and replace with "US Patent 8,820,294".

-- Column 5, Line 35, delete "US 20110271932" and replace with "US Patent 8,800,528".

Signed and Sealed this
Sixth Day of June, 2017

Michelle K. Lee
*Director of the United States Patent and Trademark Office*